3,088,923
PROCESS FOR THE PREPARATION OF
POLYADDITION PRODUCTS
Rudolf Gabler, Kusnacht, and Hans R. Meyer, Kilchberg, Switzerland, and Alexandre J. Kohlik, Eugene, Oreg., assignors to W. R. Grace & Co., Cambridge, Mass., a corporation of Connecticut
No Drawing. Filed Feb. 24, 1960, Ser. No. 10,576
14 Claims. (Cl. 260—2)

This invention relates to the preparation of viscous, oily and frequently adhesive linear polyaddition products which are soluble in water and in a number of organic solvents such as acetic acid and various alcohols, ethers, and amines. These linear addition products are useful in themselves as viscosity controlling and adhesive enhancing agents in various aqueous and organic media and as intermediates in the preparation of infusible resins.

The linear polyaddition products of the present invention are prepared by the reaction at temperatures below 150° C. of butadiene dioxide (1,2,3,4-diepoxybutane) with certain diprimary glycols having the formula:

$$(CH_2OH)_2X$$

where X is selected from the group consisting of single bonds, saturated and unsaturated aliphatic radicals and saturated and unsaturated cyclic radicals provided that in no case are the two OH groups separated by more than six carbon atoms.

The diepoxy compounds, of which the simplest representative is butadiene dioxide, are of a major technical importance in the manufacture of plastics. Normally, however, the diepoxy compounds, when reacted, result in cross-linked, insoluble and unmelting resins, which while they are very useful, do create some difficulties in application. Normally such resins are prepared by a reaction in situ initiated by mixing the diepoxy compound with the other reactants immediately before application.

We have discovered that it is possible to obtain linear polyaddition products by the reaction of butadiene dioxide and diprimary glycols provided the OH groups in the diprimary glycols are attached directly to a methylene group and are not separated by more than six carbon atoms, provided the reaction is carried out at temperatures not in excess of 150° C. and provided the reaction mixture is completely free of acidic or basic compounds and substantially free of water. Linear molecular chains are possible in a polyaddition reaction in the presence of butadiene dioxide only when the reaction of the secondary hydroxy groups derived from the rupture of epoxy rings with other epoxy groups is inhibited or prevented. We have found that the presence of acidic or basic compounds and more than mere traces of water in the reaction mixture promotes the formation of secondary hydroxy groups by the rupture of epoxy rings. We have also found that temperatures substantially in excess of 150° C. also promote such a reaction. With diprimary glycols of the type described, the reaction rate with the epoxy group is so rapid in the absence of catalysts or excessive temperature that substantially no branching or cross-linking takes place.

In view of these requirements of the reaction, we prefer to react the butadiene dioxide and the diprimary glycol at temperatures between 90 and 120° C. At temperatures lower than 90° C. the reaction rate is too slow to be practical, while at temperatures in excess of 120° C. and especially in excess of 150° C. cross-linking and branching is encouraged. In addition, it is necessary to purify both the butadiene dioxide and the diprimary glycol to the extent necessary to insure that these ingredients are completely free of acidic or basic compounds and contain, at most, only traces of water.

The polyaddition reaction of the present invention may be carried out either in bulk or in solution. It is preferable to carry it out in solution, since by so doing, the temperature of the reaction mixture can better be controlled since the presence of a solvent especially a solvent not only for the reactants, but for the reaction product, lowers the viscosity of the mixture and permits better mixing. The preferable solvents are various ethers and especially dioxane. Doxane is prfeerred because it is an excellent solvent not only for the reactants but for the reaction product and reaction proceeds rapidly at its boiling point. Other suitable ethers which may be used as solvents for this reaction are: tetrahydrofurane, dioxolane, methyl dioxolane, ethylene glycol-dimethyl ether, diisopropyl ether, and neopentylglycoldimethyl ether. In some instances, it is preferable to carry out the reaction in a two-phase system. This may be accomplished by using a solvent in which some, but not all, of the ingredients present in the reaction mixture are soluble. For example, hydrocarbons such as benzene, toluene, xylene, tetralin and decalin dissolve butadiene dioxide but are not a solvent for either the glycols or the polymer.

In order to obtain a high degree of polymerization, the glycol and the butadiene dioxide are preferably used in equimolar quantities. A substantial excess of glycol limits the chain length of the reaction product and results in a reaction product in which the polymer chains are terminated with a primary hydroxy group. On the other hand, a substantial excess of butadiene dioxide results in polymers having epoxy groups at the end of the polymer chain. Such epoxy groups are capable of reacting further and may be used to cross-link such resins in the presence of acidic or basic catalysts.

The polyaddition reaction of our invention is preferable carried out in a batch process in a closed stainless steel vessel provided with a stirrer. The reaction should be conducted in an atmosphere of nitrogen, hydrogen, argon, or other inert gas in order to avoid the presence of oxygen, water, and carbon dioxide. Suitable diprimary glycols coming within the definition given above include ethane-1,2-diol; propane-1,3-diol; butane-1,4-diol; pentane-1,5-diol and hexane-1,6-diol. In addition to these straight-chain diprimary glycols, various branched, cyclical and substituted diprimary glycols may be used provided that the substituent groups have no catalytic influence promoting the self polyaddition of butadiene dioxide. Suitable substituents are alkyl and aryl substituents, ether and thioether groups, nitro groups, and certain fluorine and chlorine containing compounds. Suitable substituted, branched and cyclical glycols include 2,2 - dimethylpropane - 1,3 - diol; 2 - methylpropane-1,3-diol; 3-phenylpentane-1,5-diol; 2-nitropropane-1,3-diol; 2 - nitro - 2 - methylpropane - 1,3 - diol; 2,2 - dimethoxymethylpropane - 1,3 - diol; 1,1,2,2-tetrafluoroethane - 1,2 - diol; 2 - chloropropane - 1,3 - diol; 1,4-bis(hydroxymethyl)cyclohexane; 1,3 - bis(hydroxymethyl)cyclohexane; 1,4-bis(hydroxymethyl)benzene; and 1,3-bis(hydroxymethyl)benzene.

Especially interesting polyaddition products are obtained when unsaturated aliphatic diprimary glycols are used instead of saturated aliphatic diprimary glycols. Such linear polyaddition products are subject to further addition or polymerization reaction involving the double bond in addition to the esterification, etherification, and halogenation reactions and the like to which all of the polyaddition products of this invention are subject. Suitable unsaturated diprimary glycols include 2-butene-1,4-diol and 2-butyne-1,4-diol, if a single unsaturated linkage per recurring group is desired, and 2,4-hexadiene-1,6-diol and 2-hexene-4-yne-1,6-diol if two unsaturated linkages per recurring group is desired.

Technical butadiene dioxide is not a homogeneous product, but contains a mixture of two stereo isomers, meso- and dl-. If desired, the two isomers can be separated since they do have slightly different boiling and melting points. For example, the meso form boils at 37° C. at 10 mm. pressure and melts at −10.3° C., and the dl form boils at 42° C. at 10 mm. pressure and melts at +5.8° C. However, we have found that the steric configuration has no influence on the properties of the linear polyaddition product and therefore either the meso or the dl form or any mixture thereof may be used with equivalent results.

*Example I*

86.1 kilograms of butadiene dioxide (a mixture of about 90% dl form and 10% meso form) was mixed with 62.1 kilograms of ethylene glycol (ethane-1,2-diol) in a 250 liter autoclave equipped with a stirring mechanism, a bottom vent and an emptying pump. The ethylene glycol had previously been redistilled several times to free it from moisture and other impurities. The air was removed from the autoclave by flushing with pure, dry nitrogen and the mixture was gradually heated to 120° C. at 10 mm. of nitrogen pressure and stirred at this temperature for 100 hours. At this point the butadiene dioxide content was less than 1% of the starting amount. The reaction vessel was cooled and when the temperature of the reaction mixture had dropped to 70–80° C., the contents of the vessel were removed with the pump. The resulting polymer at room temperature was a viscous, water-soluble resin having a high adhesive power.

*Example II*

Using the procedure outlined in Example I, 86.1 kilograms of butadiene dioxide were mixed with 31.03 kilograms of redistilled ethylene glycol and reacted in a nitrogen atmosphere for 125 hours at 90° C. At the end of this period the excess butadiene dioxide was distilled off in vacuum. The resulting reaction product was a water-soluble, oily polymer containing about 15% residual epoxy groups. The reaction of this polymer with 1% by weight of piperidine at a temperature of 100° C. resulted in a completely insoluble resin.

*Example III*

Following the procedure of Example I, 43.05 kilograms of butadiene dioxide were mixed with 44.05 kilograms of 2-butene-1,4-diol and the mixture was heated in a nitrogen atmosphere at 110° C. for 80 hours. A water soluble resin resulted. The presence of unsaturated bonds in the resin was shown by the fact that the hydrogenation of 100 grams of the resin in the presence of a platinum catalyst resulted in a hydrogen consumption of 1.1 grams or 96% of theoretical.

*Example IV*

Following the procedure of Example I, 43.05 kilograms of butadiene dioxide were mixed with 43.05 kilograms of 2-butyne-1,4-diol and heated for 84 hours in a nitrogen atmosphere at a temperature of 90° C. The resulting resin was water-soluble. The presence of unsaturated bonds was shown by the fact that when 100 grams of the resin was hydrogenated in the presence of a platinum catalyst 2.28 grams of hydrogen or 98% of theoretical was absorbed.

*Example V*

21.5 kilograms of butadiene dioxide and 26.0 kilograms of 2,2-dimethylpropane-1,3-diol were mixed with 50 liters of 1,4-dioxane in a 250 liter stainless steel reaction vessel equipped with a reflux condenser and a gas inlet tube. After the air had been removed with nitrogen, the mixture was refluxed for 74 hours at which point there was no detectable residual butadiene dioxide. The dioxane was distilled off initially at atmospheric pressure and finally under vacuum. The polymer was removed from the vessel under pressure. The resulting polymer at room temperature was a viscous, but moldable water-soluble mass.

We claim:

1. Process for the preparation of a water-soluble, linear polyaddition product which consists of reacting butadiene dioxide in an inert atmosphere at an elevated temperature below 150° C. in the absence of any acidic or basic constituent with a substantially equimolar quantity of a diprimary glycol wherein the two primary hydroxy groups are directly connected by a carbon-to-carbon chain, having between two and six carbon atoms, said diprimary glycol being selected from the group consisting of saturated aliphatic diprimary glycols, unsaturated aliphatic diprimary glycols, saturated cyclic diprimary glycols, unsaturated cyclic diprimary glycols, and the alkyl, aryl, ether, thioether, nitro, fluorine, and chlorine derivatives of the same.

2. Process according to claim 1 wherein the diprimary glycol is a saturated aliphatic diprimary glycol having between two and six carbon atoms.

3. Process according to claim 2 wherein the diprimary glycol is ethylene glycol.

4. Process according to claim 1 wherein the diprimary glycol is an unsaturated aliphatic diprimary glycol.

5. Process according to claim 4 wherein the diprimary glycol is 2-butene-1,4-diol.

6. Process according to claim 4 wherein the diprimary glycol is 2-butyne-1,4-diol.

7. Process according to claim 4 wherein the diprimary glycol is 2,4-hexadiene-1,6-diol.

8. Process according to claim 4 wherein the diprimary glycol is 2-hexene-4-yne-1,6-diol.

9. Process according to claim 1 wherein the diprimary glycol is a cyclo aliphatic primary glycol.

10. Process according to claim 9 wherein the diprimary glycol is bis(hydroxymethyl)cyclohexane.

11. Process according to claim 1 wherein the diprimary glycol is a diprimary aromatic glycol.

12. Process according to claim 11 wherein the diprimary glycol is bis(hydroxymethyl)benzene.

13. A water-soluble, linear polyaddition product formed by the reaction of butadiene dioxide in an inert atmosphere at an elevated temperature below 150° C. in the absence of any acidic or basic constituent with a substantially equimolar quantity of a diprimary glycol wherein the two primary hydroxy groups are directly connected by a carbon-to-carbon chain having between two and six carbon atoms, said diprimary glycol being selected from the group consisting of saturated aliphatic diprimary glycols, unsaturated aliphatic diprimary glycols, saturated cyclic diprimary glycols, unsaturated cyclic diprimary glycols, and the alkyl, aryl, ether, thioether, nitro, fluorine, and chlorine derivatives of the same.

14. The product of claim 13 obtained when said saturated aliphatic diprimary glycol is ethylene glycol.

References Cited in the file of this patent

UNITED STATES PATENTS

| | | |
|---|---|---|
| 2,098,097 | Hopff et al. | Nov. 2, 1937 |
| 2,213,477 | Steindorff et al. | Sept. 3, 1940 |
| 2,385,970 | De Groote et al. | Oct. 2, 1945 |
| 2,633,458 | Shokal | Mar. 31, 1953 |
| 2,824,083 | Parry et al. | Feb. 18, 1958 |
| 2,456,408 | Greenlee | Dec. 14, 1958 |
| 2,872,432 | Metzger | Feb. 3, 1959 |